Jan. 10, 1961     K. V. LIVELSBERGER     2,967,626
SHANKLESS COUPLER ARRANGEMENT
Filed Sept. 13, 1957
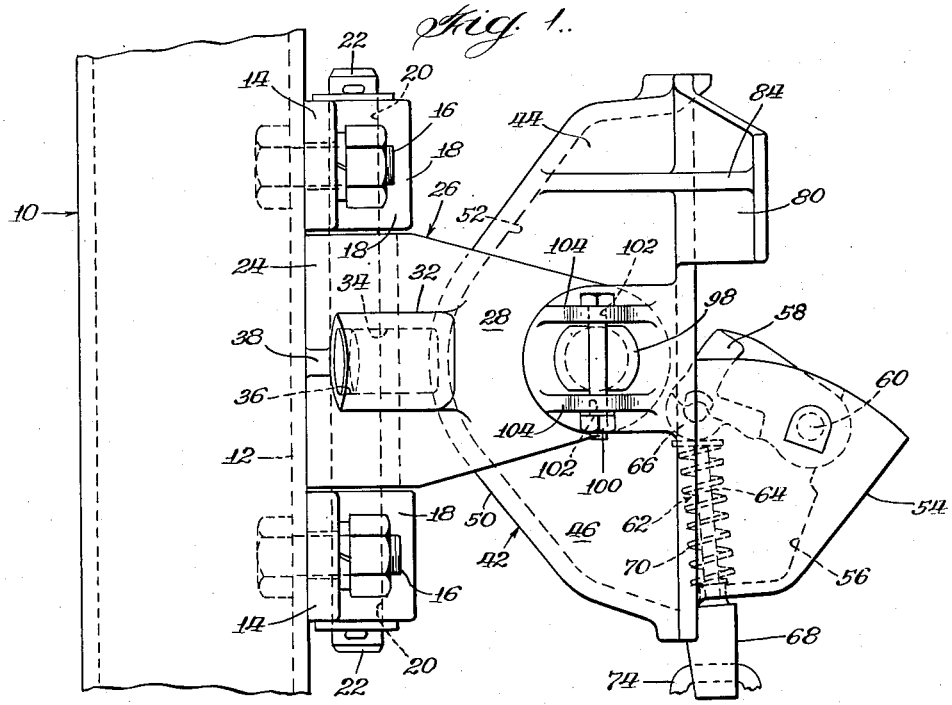
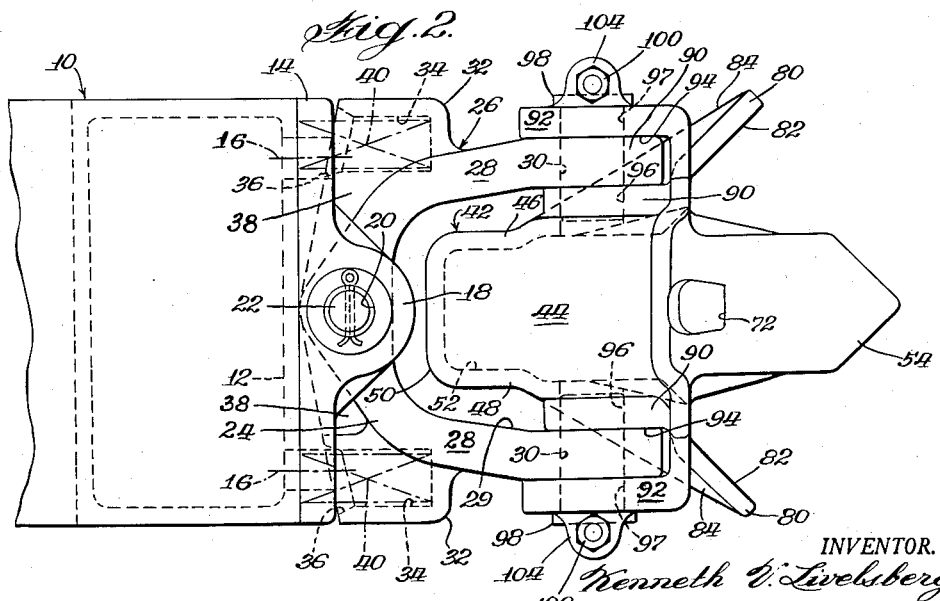
INVENTOR.
Kenneth V. Livelsberger
BY Walter F. Schlegel, Jr.
Atty.
Witness:
Richard W. Carpenter

United States Patent Office 2,967,626
Patented Jan. 10, 1961

2,967,626

SHANKLESS COUPLER ARRANGEMENT

Kenneth V. Livelsberger, Alliance, Ohio, assignor to American Steel Foundries, Chicago, Ill., a corporation of New Jersey Filed Sept. 13, 1957, Ser. No. 683,816

7 Claims. (Cl. 213—75)

This invention relates to vehicle couplers and more particularly to an improved arrangement for connecting an industrial type coupler to vehicle such as an ore buggy or mine car.

The invention is particularly concerned with a novel universal joint type connection arrangement for securing a shankless coupler to a vehicle.

In conventional coupling arrangements, a standard coupler comprising a head and integral shank extending rearwardly therefrom is pivotally connected to the car by means of a pin or bar extending through aligned apertures presented by the coupler shank and by the end of the vehicle or by a draft gear machanism or cushioning device carried by the vehicle. Ordinarily in this type of arrangement, the pivotal axis of the coupler is located well to the rear of the coupler head requiring the use of a relatively long coupler shank in order to accommodate the large degree of angling necessary for the coupler to be self-aligning with a mating coupler.

Accordingly, it is a primary object of this invention to provide a novel coupler and coupler mounting arrangement wherein a coupler shorter than the standard couplers can be afforded an angling range greater than that of conventional couplers.

Another object of the invention is the provision of a shankless coupler and mounting means therefor.

A further object of the invention is to provide a universal joint type connection for mounting a coupler on a vehicle.

A more specific object of the invention is to provide a vehicle coupling arrangement comprising a yoke pivoted to the vehicle on fixed axis and a coupler pivoted to the yoke on an axis normal to the first mentioned axis.

These and other objects will be apparent from an examination of the following description and drawings, wherein:

Figure 1 is a fragmentary top plan view of a coupler arrangement embodying features of my invention, and Figure 2 is a fragmentary side elevational view of the structure illustrated in Figure 1.

It will be understood that certain elements have been intentionally omitted from certain views where they are better illustrated in other views.

Referring now to the drawings for better understanding of the invention, it will be seen that the vehicle 10 to which the coupler is applied, is provided with an end wall or plate 12 against the outer surface of which is mounted a pair of generally vertically extending pivot plates 14 spaced transversely of the vehicle from each other. The plates 14 may be detachably secured at their upper and lower ends to the vehicle end wall 12 by means of nut and bolt assemblies 16. The pivot plates 14 include centrally disposed bosses or mounting lugs 18 which present aligned apertures 20.

Secured to the plates 14 by means of a pin 22 extending through lug apertures 20 is the rear section 24 of a yoke or clevice 26 having a pair of vertically spaced forwardly extending arms 28. Pin 22 extends transversely of the car to afford a horizontal pivotal axis for the yoke 26. Adjacent their forward extremities, the yoke arms 28 present vertically spaced aligned apertures 30, the purpose of which, is hereinafter described.

Formed integrally with or secured to the rearward section 24 of the yoke 26 are a pair of vertically spaced spring housings 32, each of which, presents an internal spring pocket 34 with a chamfered opening 36 facing the vehicle end wall 12. To add rigidity to the structure, a pair of vertically extending ribs 38 may be provided to further secure the spring housings 32 to the rear section 24 of the yoke 26. Disposed within the spring pockets 34 of the respective housings 32 are a pair of compression springs 40 (shown diagrammatically) compressibly engageable with the vehicle end wall 12 and operable to yieldably resist vertical angling of the yoke, about its horizontal axis pin 22, relative to the vehicle.

Still referring to the drawings, it will be seen that the novel coupler employed herein is a shankless coupler 42 comprising a head 44 having top, bottom, and vertical walls 46, 48, and 50, respectively, which define therebetween a pocket or recess 52 adapted to receive the locking member of a mating coupler. Preferably formed integrally with the forward portion of the coupler is a hollow nose 54 having an internal pocket 56 in which is pivoted, by a pin 60, a knuckle or rotatable locking member 58. Inasmuch as the actual coupling and locking mechanism does not form an essential feature of this invention, it is not illustrated in detail and may be of any desired type such as that used in a conventional industrial coupler wherein the locking member 58 is retained in pre-set position by means of a spring mechanism indicated generally at 62 comprising a spring guide rod 64 disposed within a coil compression spring 70 and having at its inboard end a locking member engaging element 66 and having at its outboard end a head wall engaging element 68 extending through aperture 72 in the coupler head wall and connected to a handle 74.

In order to increase the self-aligning ability of the coupler, the head may be provided with a pair of upper and lower gathering lips 80 which present forwardly diverging flat gathering surfaces 82. Reinforcement for the lips may be provided by a pair of generally vertically extending ribs 84 connecting the lips to the top and bottom coupler head walls 46 and 48, respectively.

As best seen in Figure 2, the top and bottom coupler head walls 46 and 48 are provided on their outer surfaces with centrally disposed enlarged portions or bosses 90 and also the walls have extending therefrom additional brackets or shelves 92, each of which, defines with its adjacent boss 90 a slot 94 open rearwardly of the coupler head. The brackets 92 and bosses 90 are provided with vertically aligned apertures 97 and 96, respectively.

The coupler 42 is supported by the yoke 26 and is disposed within the opening 29 between the yoke arms 28 and is connected to the yoke arms 28, the ends of which are disposed within the respective slots 94, by means of a pair of axially spaced aligned vertically disposed pins 98.

These pins 98 may be retained in position by means of nut and bolt assemblies 100 which are disposed to extend through aligned apertures 102 presented by spaced lugs 104 extending from the brackets 92.

Thus, it will be understood that the novel use of a shankless coupler, together with a supporting yoke affords a universal joint type connection mounting which permits the use of a coupler of relatively small size occupying a minimum amount of space which can be disposed relatively close to the car and at the same time will still be afforded a maximum amount of freedom for both horizontal and vertical angling.

I claim:

1. In a vehicle coupling arrangement the combination of: a shankless coupler having a head and a knuckle; a yoke; means for pivotally connecting the yoke to the vehicle to permit relative rotational movement therebetween about an axis lying in a vertical plane extending transversely of the vehicle; said yoke having a pair of forwardly extending vertically spaced arms defining therebetween an opening for receiving the coupler head; and means for pivotally connecting the coupler head to the yoke arms to permit relative rotational movement therebetween about another axis extending in a direction normal to said first mentioned axis, lying in a plane parallel to said first mentioned plane, and passing through the coupler head; said means comprising a pair of axially aligned pins spaced from each other at opposite sides of the coupler head and extending through related axially aligned openings of the yoke arms and the coupler head, respectively, disposed at opposite sides of the coupler head.

2. In a vehicle coupling arrangement the combination of: a shankless coupler having a head and a knuckle; a yoke; means for pivotally connecting the yoke to the vehicle to permit relative rotational movement therebetween about a horizontal axis extending transversely of the vehicle; said yoke having a pair of forwardly extending vertically spaced arms defining therebetween an opening for receiving the coupler head; means for pivotally connecting the coupler head to the yoke arms to permit relative rotational movement therebetween about a vertical axis passing through the coupler head; said means comprising a pair of axially aligned vertically spaced pins extending through related vertically aligned openings of the yoke arms and the coupler head, respectively, and disposed on opposite sides of the coupler head.

3. In a vehicle coupling arrangement, the combination of: coupler mounting plate means detachably secured to the vehicle and presenting a pair of transversely spaced forwardly extending pivot lugs; a coupler mounting yoke, generally U-shaped as seen in side elevation, having a rearwardly extending center section disposed between and pivotally connected to the lugs of said plate for movement about a horizontal axis extending transversely of the vehicle, said yoke including a pair of vertically spaced forwardly extending arms defining a coupler receiving opening therebetween; and a shankless coupler disposed in the yoke opening and comprising a head and knuckle, said head having outwardly extending shelves defining horizontally extending vertically spaced slots, axially aligned vertical openings extending through the sides of said slots respectively, the respective arms of the yoke having vertical openings adjacent their free end portions and being received within the respective slots, said arms being pivotally connected to the head by a pair of axially aligned vertically spaced pins extending through said openings and being disposed on opposite sides of the coupler head and accommodating pivotal movement of the coupler in the yoke about a vertical axis passing through the head of the coupler, the pivotal connections between the yoke and vehicle and the yoke and coupler serving as a universal joint type connection accommodating both vertical and horizontal angling of the coupler relative to the vehicle.

4. A vehicle coupling arrangement according to claim 3, wherein said center section has spring housings disposed on opposite sides of said first mentioned pivotal connection, spring means disposed in each housing and engaging the housing and the vehicle, thereby yieldingly resisting rotative movement of said yoke about said horizontal axis.

5. In a vehicle coupling arrangement, the combination of: coupler mounting means on the vehicle; a coupler yoke detachably connected to said means for pivotal movement about a horizontal axis extending transversely of the car, said yoke including a pair of forwardly extending vertically spaced arms defining a coupler receiving opening therebetween; and a shankless coupler comprising a head and knuckle, said coupler being disposed in said yoke opening between said arms and being connected to said arms by a pair of axially aligned vertically spaced pins extending through vertically aligned openings of the yoke arms and head, respectively, said pins being disposed on opposite sides of the coupler head and accommodating relative horizontal pivotal movement of the yoke and the coupler, the pivotal connections between the yoke and vehicle and the yoke and coupler accommodating both vertical and horizontal angling of the coupler relative to the vehicle.

6. In a vehicle coupling arrangement, the combination of: a yoke member and a shankless coupler member, means for connecting said yoke member to the vehicle for rotative movement about a pivotal axis, means for connecting said coupler member to said yoke member for rotative movement about a pivotal axis normal to said first mentioned axis, said last mentioned means being disposed on opposite sides of said coupler member and comprising spaced shelves defining slots receiving said yoke member, said yoke member being secured therein by a pair of axially spaced pins extending through aligned apertures of said yoke member and shelves, respectively, said pivotal connections affording a universal joint connection between the coupler and the vehicle accommodating both horizontal and vertical angling of the coupler relative to the vehicle.

7. A vehicle coupling arrangement according to claim 6, wherein the rearward section of said yoke member has spring housings disposed on opposite sides of said first mentioned means, spring means disposed in the housings and engaging the respective housing and the vehicle, thereby yieldingly resisting rotative movements of said yoke member about said first mentioned pivotal axis.

References Cited in the file of this patent

UNITED STATES PATENTS

| | | |
|---|---|---|
| 1,109,246 | Pope | Sept. 1, 1914 |
| 1,346,538 | George | July 13, 1920 |
| 1,369,224 | Davis | Feb. 22, 1921 |
| 1,690,650 | Regan et al. | Nov. 6, 1928 |
| 1,951,318 | Barrows | Mar. 13, 1934 |
| 2,386,476 | Kinne et al. | Oct. 9, 1945 |